United States Patent
Ohtsuka et al.

(10) Patent No.: US 11,718,524 B2
(45) Date of Patent: Aug. 8, 2023

(54) METHOD FOR MANUFACTURING SULFUR TETRAFLUORIDE

(71) Applicant: DAIKIN INDUSTRIES, LTD., Osaka (JP)

(72) Inventors: Tatsuya Ohtsuka, Osaka (JP); Yoshichika Kuroki, Osaka (JP); Atsushi Shirai, Osaka (JP); Moe Hosokawa, Osaka (JP); Yosuke Kishikawa, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 17/570,069

(22) Filed: Jan. 6, 2022

(65) Prior Publication Data

US 2022/0127144 A1   Apr. 28, 2022

Related U.S. Application Data

(62) Division of application No. 16/472,395, filed as application No. PCT/JP2017/040791 on Nov. 13, 2017, now Pat. No. 11,339,052.

(30) Foreign Application Priority Data

Dec. 26, 2016 (JP) .................................. 2016-251308

(51) Int. Cl.
*C01B 17/45* (2006.01)

(52) U.S. Cl.
CPC ................................ *C01B 17/4523* (2013.01)

(58) Field of Classification Search
CPC ......... C01B 17/4523; C01B 9/08; C01B 7/24; C07B 39/00; C07C 17/16; C07C 17/18
See application file for complete search history.

(56) References Cited

U.S. PATENT DOCUMENTS

| | | | |
|---|---|---|---|
| 2,992,073 A | 7/1961 | Tullock et al. | |
| 3,399,036 A | 8/1968 | Kleinberg et al. | |
| 3,848,064 A | 11/1974 | Becher et al. | |
| 6,225,514 B1 | 5/2001 | Cook et al. | |
| 2003/0119304 A1* | 6/2003 | Vaartstra | C09G 1/02 438/630 |
| 2010/0260659 A1 | 10/2010 | Winter | |
| 2012/0245063 A1 | 9/2012 | DiBiase et al. | |
| 2019/0375636 A1 | 12/2019 | Ohtsuka et al. | |

FOREIGN PATENT DOCUMENTS

| | | |
|---|---|---|
| CN | 1644490 | 7/2005 |
| JP | 56-26704 | 3/1981 |
| JP | 6-310468 | 11/1994 |
| JP | 2005-514799 | 5/2005 |
| WO | 03/060028 | 7/2003 |
| WO | 2018/123301 | 7/2018 |

OTHER PUBLICATIONS

W. R. Hasek et al., "The Chemistry of Sulfur Tetrafluoride. II. The Fluorination of Organic Carbonyl Compounds[1]" Journal of the American Chemical Society, 1960, vol. 82, No. 3, pp. 543-551.
International Search Report dated Jan. 30, 2018 in corresponding International (PCT) Application No. PCT/JP2017/040791.
Lau et al., "The Reaction Of Chlorine Monofluoride With Selenium Dioxide, Tetrachloride And Sulphur Tetrachloride", Journal of Fluorine Chemistry, vol. 6, No. 1, 1975, pp. 77-81.
Tullock et al., "The Chemistry of Sulfur Tetrafluoride. I. The Synthesis of Sulfur Tetrafluoride", Chemistry of Sulfur Tetrafluoride, vol. 82, No. 3, Feb. 1960, pp. 539-542.
Hara et al., "IF$_5$-pyridine-HF: air- and moisture-stable fluorination reagent", Tetrahedron, vol. 68, No. 49, 2012, pp. 10145-10150.
Extended European Search Report dated Jun. 29, 2020 in corresponding European Patent Application No. 17885682.9.
Schmidt, W., "Brief Communication on SF$_4$ and S$_2$O$_5$F$_2$", Monatshefte fuer Chemie, 1954, pp. 452-453, with English translation.

* cited by examiner

*Primary Examiner* — Andrew J. Oyer
(74) *Attorney, Agent, or Firm* — Wenderoth, Lind & Ponack, L.L.P.

(57) ABSTRACT

An object of this invention is to provide a simple method for producing sulfur tetrafluoride. The object is achieved by a method for producing sulfur tetrafluoride, comprising step A of reacting a fluorinated halogen compound with sulfur chloride, the fluorinated halogen compound being represented by formula: $XF_n$, wherein X is chlorine, bromine, or iodine; and n is a natural number of 1 to 5.

1 Claim, No Drawings

METHOD FOR MANUFACTURING SULFUR TETRAFLUORIDE

TECHNICAL FIELD

The present invention relates to a method for producing sulfur tetrafluoride.

Sulfur tetrafluoride is known to act as a deoxyfluorinating agent in reactions of carboxylic acid (R—CO$_2$H), aldehyde (RCHO), alcohol (ROH), ketone (R—COR'), etc. to give fluorinated compounds such as R—CF$_3$, R—F, and R—CF$_2$—R', respectively corresponding to these substrates. Sulfur tetrafluoride is thus a useful substance as a starting material for production of pharmaceuticals and agricultural chemicals, liquid crystal compounds, functional materials, etc.

BACKGROUND ART

Examples of known methods for producing sulfur tetrafluoride include a reaction of sulfur with fluorine gas (Patent Literature 1), a reaction of sulfur with iodine pentafluoride (Non-patent Literature 1), a reaction of an alkali metal fluoride with sulfur dichloride (Patent Literature 2), a reaction of sulfur, bromine, and an alkali metal fluoride (Patent Literature 3), and the like.

CITATION LIST

Patent Literature

PTL 1: U.S. Pat. No. 3,399,036
PTL 2: U.S. Pat. No. 2,992,073
PTL 3: U.S. Patent Application Publication No. 2010/260659

Non-Patent Literature

NPL 1: J. Am. Chem. Soc., 82, p. 539 (1960)

SUMMARY OF INVENTION

Technical Problem

However, the above production methods have the following problems.

The method disclosed in Patent Literature 1 requires high temperatures of 300° C. or more to obtain SF$_4$ with high purity and causes large heat generation due to the reaction; thus, hot spots develop, leading to severe reactor corrosion.

In the method disclosed in Non-patent Literature 1, iodine produced by the reaction remains in the reactor as a solid, and it is thus necessary to remove the solid iodine from the reactor. This makes it difficult to perform the reaction repeatedly.

The method disclosed in Patent Literature 2 has low productivity because it requires the use of a large amount of a polar solvent. Moreover, solids formed by the reaction make recycle etc. of the solvent difficult, resulting in a lot of waste.

The method disclosed in Patent Literature 3 is not suitable for mass production because it is difficult to stir the reaction mixture, which is a solid.

Thus, there is a need for a new method for producing sulfur tetrafluoride.

In view of the problems described above, an object of the present invention is to provide a simple method for producing sulfur tetrafluoride, in particular, a production method that does not require high temperature.

Solution to Problem

The present inventors conducted extensive research to solve the above problems and found that mixing IF$_5$ with readily available sulfur monochloride at room temperature vigorously produces a gas. The results of analysis demonstrated that this is sulfur tetrafluoride.

The inventors conducted further extensive research and found that the problems can be solved by a method for producing sulfur tetrafluoride, comprising step A of reacting a fluorinated halogen compound with sulfur chloride, the fluorinated halogen compound being represented by formula: XF$_n$, wherein X is chlorine, bromine, or iodine, and n is a natural number of 1 to 5. The present invention has thus been accomplished.

The present invention includes the following embodiments.

Item 1. A method for producing sulfur tetrafluoride, comprising step A of reacting a fluorinated halogen compound with sulfur chloride, the fluorinated halogen compound being represented by formula: XF$_n$, wherein X is chlorine, bromine, or iodine; and n is a natural number of 1 to 5.

Item 2. The method according to Item 1, wherein the fluorinated halogen compound is IF$_5$, BrF$_3$, or a combination thereof.

Item 3. The method according to Item 2, wherein the fluorinated halogen compound is IF$_5$.

Item 4. The method according to Item 3, wherein as a by-product, ICl is produced, but substantially no I$_2$ is produced.

Item 5. The method according to any one of Items 1 to 4, wherein the sulfur chloride is sulfur monochloride.

Item 6. A composition comprising sulfur tetrafluoride and ICl.

Advantageous Effects of Invention

The present invention provides a simple method for producing sulfur tetrafluoride.

The production method of the present invention enables sulfur tetrafluoride to be suitably produced without high-temperature reaction.

The production method of the present invention can be suitably carried out without a solvent.

The production method of the present invention enables precipitation of solid iodine to be suitably suppressed, or enables no precipitation of solid iodine to occur.

The production method of the present invention enables sulfur tetrafluoride to be suitably produced using, for example, readily available sulfur monochloride as a starting material.

DESCRIPTION OF EMBODIMENTS

Terms

The symbols and the abbreviations in this specification are to be interpreted as having the general meanings in the related technical field to which the present invention pertains, according to the context of this specification, unless otherwise specified.

In this specification, the term "comprise" or "contain" is intended to encompass the meanings of "consist essentially of" and "consist of."

The steps, treatments, or operations in this specification can be performed at room temperature, unless otherwise specified.

In this specification, room temperature refers to a temperature in the range of 10 to 40° C.

The method for producing sulfur tetrafluoride according to the present invention comprises step A of reacting a fluorinated halogen compound with sulfur chloride, the fluorinated halogen compound being represented by formula: $XF_n$, wherein X is chlorine, bromine, or iodine, and n is a natural number of 1 to 5.

Preferred examples of the fluorinated halogen compound used in the production method of the present invention include $IF_5$, $BrF_3$, and $ClF_3$.

More preferred examples of the fluorinated halogen compound include $IF_5$ and $BrF_3$.

Particularly preferred examples of the fluorinated halogen compound include $IF_5$.

$IF_5$ may be high-purity $IF_5$ or a complex, such as an $IF_5$/Et3N-3HF complex or an $IF_5$-pyridine-HF complex.

The $IF_5$-pyridine-HF complex may be a substance disclosed in S. Dara, M. Monoi, R. Umemura, C. Fuse, Tetrahedron, 2012, 68, 10145-10150.

These fluorinated halogen compounds may be used singly or in a combination of two or more.

Preferred examples of the sulfur chloride used in the production method of the present invention include sulfur monochloride (SCl or $S_2Cl_2$) and sulfur dichloride ($SCl_2$).

Preferred examples of the sulfur chloride include sulfur monochloride.

These may be used singly or in a combination of two or more.

The reaction temperature in step A may be preferably room temperature.

The upper limit of the reaction temperature in step A may be preferably 100° C., and more preferably 70° C.

The lower limit of the reaction temperature in step A may be preferably −20° C., and more preferably 0° C.

The reaction temperature in step A may be preferably within the range of −20 to 100° C., and more preferably 0 to 70° C.

An excessively low reaction temperature may cause insufficient reaction of step A.

An excessively high reaction temperature is disadvantageous in view of costs and may cause undesirable reaction.

The reaction of step A can be performed by mixing the fluorinated halogen compound and the sulfur chloride.

The mixing may be performed, for example, by adding the sulfur chloride to the fluorinated halogen compound.

The fluorinated halogen compound and the sulfur chloride may be mixed at the same temperature as the reaction temperature or a temperature lower than the reaction temperature.

The temperature lower than the reaction temperature may be, for example, −100 to 0° C.

The starting materials for the reaction may be fed into a reactor at one time or in portions.

The mixing (and the reaction) can be performed, for example, by a continuous reaction using, for instance, dropwise addition and a microreactor.

The reaction of step A may be performed with stirring, as necessary.

The upper limit of the reaction time of step A may be preferably 24 hours, more preferably 10 hours, and even more preferably 5 hours.

The lower limit of the reaction time of step A may be preferably 1 minute, more preferably 10 minutes, and even more preferably 30 minutes.

The reaction time of step A may be preferably within the range of 1 minute to 24 hours, more preferably 10 minutes to 10 hours, and even more preferably 30 minutes to 5 hours.

For a reaction using a microreactor etc. as described above, a reaction time shorter than the reaction time given as an example above may be suitably used.

Specifically, the upper limit of the reaction time of the reaction using a microreactor etc. may be preferably 10 minutes, more preferably 5 minutes, and even more preferably 1 minute.

Specifically, the lower limit of the reaction time of the reaction using a microreactor etc. may be preferably 1 second.

Specifically, the reaction time of the reaction using a microreactor etc. may be preferably within the range of 1 second to 10 minutes, more preferably 1 second to 5 minutes, and even more preferably 1 second to 1 minute.

An excessively short reaction time may cause insufficient reaction of step A.

An excessively long reaction time is disadvantageous in view of costs and may cause undesirable reaction.

The upper limit of the amount of the fluorinated halogen compound used in the reaction of step A may be preferably 3 equivalents, more preferably 2.2 equivalents, and even more preferably 1.8 equivalents, with respect to the sulfur chloride in terms of molar ratio.

The lower limit of the amount of the fluorinated halogen compound used in the reaction of step A may be preferably 1 equivalent, and more preferably 1.5 equivalents, with respect to the sulfur chloride in terms of molar ratio.

The amount of the fluorinated halogen compound used in the reaction of step A may be preferably within the range of 1 to 3 equivalents, more preferably 1.5 to 2.2 equivalents, and even more preferably 1.5 to 1.8 equivalents, with respect to the sulfur chloride in terms of molar ratio.

The reaction of step A can be performed in the presence of, or in the absence of, a solvent. The reaction of step A can be preferably performed in the absence of a solvent.

A solvent is not necessarily required for this reaction. However, when a solid, such as an $IF_5$-pyridine-HF complex, is used, it is preferable to use a solvent in order to facilitate stirring.

Any solvent may be used so long as it does not react with $SF_4$, and various solvents can be used.

Specific examples include chlorine-based solvents, such as dichloromethane and chloroform; polar solvents, such as acetonitrile, DMF, and DMSO; ether-based solvents, such as diethyl ether, THF, and diisopropyl ether; hydrocarbon-based solvents, such as hexane and heptane; and ester-based solvents, such as ethyl acetate.

These solvents may be used singly or in a combination of two or more.

The reaction of step A may be suitably performed under an inert gas (e.g., nitrogen gas) atmosphere.

The sulfur tetrafluoride obtained by the reaction of step A can be recovered, for example, by purging the generated gas from the reaction system with an inert gas (e.g., nitrogen gas).

Purification and recovery of the sulfur tetrafluoride obtained by the reaction of step A may be performed by an ordinary method, such as distilling the reaction mixture as is.

The obtained sulfur tetrafluoride may be liquefied and recovered by, for example, cooling to low temperature (e.g., −78° C.) and/or compression.

The sulfur tetrafluoride obtained by the reaction of step A may be purified or concentrated by a known method, such as an adsorption method or a membrane separation method, as necessary.

According to the method for producing sulfur tetrafluoride of the present invention, sulfur tetrafluoride can be preferably obtained at a yield of 70% or more, more preferably 75% or more, and even more preferably 80% or more.

Formation of $I_2$, which is a solid, can adversely affect the implementation of the method for producing sulfur tetrafluoride according to the present invention.

When the fluorinated halogen compound is $IF_5$, the method for producing sulfur tetrafluoride according to the present invention enables ICl to be suitably produced as a by-product in step A (Example 2 described later), but substantially no $I_2$ to be produced (particularly preferably, no $I_2$ is produced).

The method for producing sulfur tetrafluoride according to the present invention suitably enables substantially no solids to be produced in step A (particularly preferably, no solids are produced).

The state in which substantially no solids are produced can be evaluated by the following: the implementation of the method for producing sulfur tetrafluoride according to the present invention is not adversely affected, and/or no solids are observed with the naked eye.

Specifically, the main products of the reaction of step A may be sulfur tetrafluoride ($SF_4$) and iodine chloride (ICl).

In this regard, the reaction of step A is believed to proceed as shown in the following scheme:

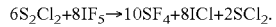

$$6S_2Cl_2 + 8IF_5 \rightarrow 10SF_4 + 8ICl + 2SCl_2.$$

However, this does not limit the present invention.

As described later in the Examples, in a typical embodiment of the present invention, when gaseous $SF_4$ is removed from the product mixture after the reaction of step A, liquid remains in the reactor. This liquid is believed to mainly contain iodine chloride; however, when an excess amount of $IF_5$ is used, the liquid also contain the remaining $IF_5$. For example, as described later in the Examples, NMR analysis of the liquid remaining in the reactor when the reaction was carried out at a ratio of about 2 moles of $IF_5$ to 1 mole of $S_2Cl_2$ demonstrated that $IF_5$ remained.

The valuable resource iodine can be recovered from the liquid in, for example, the following manner and can be reused.

The liquid is dissolved or diluted in a solvent, such as dichloromethane, followed by washing with a potassium sulfite solution. The iodine can be thereby reduced and temporarily recovered as a KI aqueous solution. The solution is oxidized with, for example, chlorine gas to recover the iodine as $I_2$, and the iodine can be reused.

The sulfur tetrafluoride obtained in the present invention can be used for deoxyfluorination of carbonyl compounds or hydroxyl-containing organic compounds; however, the use and object of production of the sulfur tetrafluoride are not limited to this. For example, the sulfur tetrafluoride can be produced for the purpose of selling the sulfur tetrafluoride itself.

The present invention also provides a composition comprising sulfur tetrafluoride and ICl.

The upper limit of the content of the ICl in the composition may be 1.2 equivalents, 1.0 equivalent, 0.9 equivalents, or 0.8 equivalents, with respect to the sulfur tetrafluoride in terms of molar ratio.

The lower limit of the content of the ICl in the composition may be 0.8 equivalents, 0.7 equivalents, or 0.6 equivalents, with respect to the sulfur tetrafluoride in terms of molar ratio.

The content of the ICl in the composition may be within the range of 0.6 to 1.2 equivalents, 0.7 to 1.0 equivalent, or 0.8 to 0.9 equivalents, with respect to the sulfur tetrafluoride in terms of molar ratio.

The method for producing the composition is understood from the method for producing sulfur tetrafluoride described above.

EXAMPLES

Examples are given below to illustrate the present invention in more detail, but the present invention is not limited to these Examples.

The $IF_5$-pyridine-HF complex used in the Examples is a known substance described in S. Hara, M. Monoi, R. Umemura, C. Fuse, Tetrahedron, 2012, 68, 10145-10150.

Example 1

Synthesis of $SF_4$ (1)

A 300-mL flask was charged with 3.4 mL (11 g) of $IF_5$, and 2.0 mL (3.4 g) of $S_2Cl_2$ was added dropwise with stirring at room temperature. A vigorous reaction occurred to generate gas. The gas was collected with a syringe and introduced into a gas cell, and its infrared spectrum was measured. The results showed absorption at 746.9 cm$^{-1}$ and 820 cm$^{-1}$, which are peaks of $SF_4$. This indicated that $SF_4$ was formed.

Generation of gas was not observed 1 hour after the completion of the dropwise addition. It was thus presumed that the reaction had already been completed.

No solid products were visually observed.

Example 2

Synthesis of $SF_4$ (2)

An autoclave was charged with 3.47 g (25.7 mmol) of $S_2Cl_2$ at room temperature. After cooling, the pressure in the reactor was reduced, and 10.5 g (47.2 mmol) of $IF_5$ was placed in the reactor.

After the mixture was stirred for 3.5 hours, cooling was stopped, and the temperature thereof was slowly brought back to room temperature. As a result, the pressure was increased to 0.6 MPa.

A cylinder was connected to the autoclave. The generated gas was liquefied and recovered in the cylinder by cooling the cylinder, thereby obtaining 4.57 g of $SF_4$ (yield: 82%).

In the autoclave, 9.4 g of liquid remained. This liquid was collected, and $^{19}$F-NMR measurement showed peaks of $IF_5$.

No solid products were visually observed.

When titration of a part (0.3959 g) of the liquid with 0.1 N sodium thiosulfate was performed until the color disappeared, 34 mL of 0.1 N sodium thiosulfate was required. This neutralized solution was diluted 400-fold with pure water, and the weight ratio of iodine, chlorine, and fluorine in the diluted solution was determined by using ion chromatography and a fluoride ion electrode. The weight ratio was the following: iodine: 73%; chlorine: 22.3%; and fluorine: 1.7%. This result showed that in addition to $SF_4$, ICl was produced as a main by-product.

Example 3

Recovery of Iodine 10 mL of 30% hydrogen peroxide solution was added to 30 mL of the aqueous solution containing iodine ions obtained in Example 2 to precipitate iodine. By filtration, 0.24 g of the precipitated iodine was recovered.

The recovery was 95%.

Example 4

Synthesis of $SF_4$ (3)

An autoclave (volume: 200 mL) was charged with 3.85 g (12 mmol) of an $IF_5$-pyridine-HF complex. After addition of 2.5 mL of dichloromethane and cooling, 0.48 mL (6 mmol) of $S_2Cl_2$ was added dropwise. No generation of heat or gas was observed.

The autoclave was sealed and then gradually heated to 70° C. in an oil bath. After 20 minutes, the pressure was increased to 0.3 MPa, which indicates formation of gas.

After stirring for 3 hours, the temperature thereof was cooled to room temperature, and a cylinder was connected to the autoclave.

The generated gas was liquefied and recovered in the cylinder by cooling the cylinder, thereby obtaining 0.9 g of $SF_4$ (yield: 69%).

The invention claimed is:

1. A composition comprising sulfur tetrafluoride and ICl, wherein the composition comprises 1.2 equivalents or less of the ICl with respect to the sulfur tetrafluoride in terms of molar ratio, and the composition does not comprise a halide salt.

* * * * *